(12) United States Patent
Murayama et al.

(10) Patent No.: US 9,302,664 B2
(45) Date of Patent: Apr. 5, 2016

(54) VEHICLE BRAKE SYSTEM

(75) Inventors: Kazuaki Murayama, Saitama (JP);
Kunimichi Hatano, Saitama (JP); Arata Inoue, Saitama (JP); Kazuyoshi Akutsu, Saitama (JP); Takaaki Ohnishi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 378 days.

(21) Appl. No.: 13/885,801

(22) PCT Filed: Nov. 17, 2011

(86) PCT No.: PCT/JP2011/076560
§ 371 (c)(1),
(2), (4) Date: May 16, 2013

(87) PCT Pub. No.: WO2012/067196
PCT Pub. Date: May 24, 2012

(65) Prior Publication Data
US 2013/0232966 A1    Sep. 12, 2013

(30) Foreign Application Priority Data

Nov. 17, 2010   (JP) ................................ 2010-257363

(51) Int. Cl.
*B60T 8/40*    (2006.01)
*B60T 13/74*   (2006.01)
*B60T 7/04*    (2006.01)
(Continued)

(52) U.S. Cl.
CPC .............. *B60T 13/745* (2013.01); *B60T 7/042* (2013.01); *B60T 8/368* (2013.01); *B60T 8/409* (2013.01); *B60T 8/4081* (2013.01); *B60T 13/662* (2013.01); *B60T 8/4086* (2013.01)

(58) Field of Classification Search
CPC ..... B60T 8/4081; B60T 8/409; B60T 8/4077; B60T 8/4086
See application file for complete search history.

(56) References Cited

U.S. PATENT DOCUMENTS 3,714,780 A * 2/1973 Shellhause ...................... 60/533
6,058,705 A   5/2000 Schunck
(Continued)

FOREIGN PATENT DOCUMENTS

CN    101070066 A    11/2007
EP    1 600 347 A1    11/2005
(Continued)

OTHER PUBLICATIONS

JP 2007176277—Machine Translation from Espacenet, Master Cylinder Device, Pub date—Jul. 2007.*
(Continued)

*Primary Examiner* — Nathaniel Wiehe
*Assistant Examiner* — Michael Quandt
(74) *Attorney, Agent, or Firm* — Carrier Blackman & Associates, P.C.; William D. Blackman; Joseph P. Carrier (57) ABSTRACT

An input device of a vehicle brake system integrally includes an integrally provided master cylinder and a stroke simulator which communicate via a hydraulic communication path. The stroke simulator is provided with a simulator piston accommodated within a simulator accommodation chamber. The simulator accommodation chamber has an opening portion enabling the insertion of the simulator piston into the simulator accommodation chamber from the side on which the brake pedal is disposed relative to the dashboard.

9 Claims, 4 Drawing Sheets

(51) Int. Cl.
    *B60T 13/66* (2006.01)
    *B60T 8/36* (2006.01)

(56) References Cited

U.S. PATENT DOCUMENTS

| | | | |
|---|---|---|---|
| 6,746,088 B2 * | 6/2004 | Chris | B60T 7/042 |
| | | | 188/358 |
| 2004/0181381 A1 * | 9/2004 | Matsuhashi | 703/7 |

FOREIGN PATENT DOCUMENTS

| | | | |
|---|---|---|---|
| EP | 1 970 271 A1 | | 9/2008 |
| JP | 2007-176277 A | | 7/2007 |
| JP | 2007176277 A | * | 7/2007 |
| JP | 2008-110633 A | | 5/2008 |
| JP | 2010-023594 A | | 2/2010 |
| JP | 2010-254261 A | | 11/2010 |

OTHER PUBLICATIONS

Office Action dated Nov. 4, 2014 issued in the corresponding Chinese Patent Application 201180054528.1.

extended European search report issued Mar. 14, 2014 in corresponding EP Patent Application 11840898.8.

* cited by examiner

VEHICLE BRAKE SYSTEM

CROSS REFERENCE TO RELATED APPLICATIONS

This application claims the foreign priority benefit under Title 35, United States Code, 119 (a)-(d) of Japanese Patent Application No. 2010-257363, filed on Nov. 17, 2010 in the Japan Patent Office, the disclosure of which is herein incorporated by reference in its entirety.

TECHNICAL FIELD

The present invention relates to a vehicle brake system including an input device and an electric brake actuator, wherein the input device detects an amount of operation by an operator, and the electric brake actuator generates a brake hydraulic pressure on the basis of an electric signal corresponding to the amount of operation.

BACKGROUND ART

There has so far been known as a brake system for a vehicle (a car), for example, a brake system including a booster device such as a negative pressure booster and a hydraulic pressure booster. In recent years, an electric booster device (an electric brake actuator) using an electric motor as a boosting source has been known (for example, see Patent Document 1).

The electric booster device disclosed in Patent Document 1 is configured to include a main piston which is reciprocated by an operation of a brake pedal (a brake operation element), a cylindrical booster piston which is fitted externally to the main piston so as to be displaceable relative to the main piston, and an electric motor which reciprocates the booster piston.

The electric booster device has the main piston and the booster piston as pistons of a master cylinder and have each of front end portions of the pistons facing a pressure chamber of the master cylinder, and is capable of generating a brake hydraulic pressure in the master cylinder, by a thrust force inputted to the main piston from the brake pedal by the operator and by a booster thrust force inputted to the booster piston from the electric motor. In a brake system including an electric booster device, the brake system including a stroke simulator, which allows a stroke of the brake pedal by absorbing a brake fluid sent out by the master cylinder, has been also known (for example, see Patent Document 2).

CITATION LIST

Patent Literature

{Patent Document 1}
Japanese Patent Application Publication No. 2010-023594
{Patent Document 2}
Japanese Patent Application Publication No. 2008-110633

SUMMARY OF INVENTION

Technical Problem

Since the stroke simulator communicates with the master cylinder via a hydraulic communication path, it is preferred to improve an operator's feeling for the operation and a response to the operation of the brake operation element by shortening the hydraulic communication path. When the stroke simulator is attached to an attachment member (for example, a dashboard) mounted on a vehicle body, it is preferred that the assembly is facilitated.

The present invention has been made in view of such circumstances, and an objective of the present invention is, in a vehicle brake system including an input device having the stroke simulator, to improve the assembly of the stroke simulator while improving a response of the stroke simulator to an operation of a piston connected to the brake operation element and improving the operator's feeling for the brake operation element by the stroke simulator.

Solution to Problem

The invention described in claim 1 is a vehicle brake system comprising an input device 14 for detecting an amount of operation by an operator and an electric brake actuator 16 for generating a brake hydraulic pressure at least on the basis of an electric signal according to the amount of operation, wherein the input device 14 is integrally formed to include a master cylinder 34 and a stroke simulator 64, the master cylinder 34 generating a hydraulic pressure in response to an input by a piston 40a connected to a brake operation element 12, and the stroke simulator 64 being integrally provided with the master cylinder 34 as well as communicating with the master cylinder 34 via hydraulic communication paths 58b, 58c, wherein the stroke simulator 64 includes a simulator piston 68 and a simulator accommodation chamber 64c which accommodates the simulator piston 68 therein, the simulator piston 68 being movable against an urging force of urging members 66a, 66b by being driven by the hydraulic pressure in the simulator accommodation chamber 64c, and the simulator accommodation chamber 64c including an opening portion 64e which enables the simulator piston 68 to be inserted into the simulator accommodation chamber 64c from the side on which the brake operation element 12 is disposed.

According to this aspect, since the master cylinder and the simulator are integrally provided in the input device, it is possible to shorten the hydraulic communication paths, thereby improving a response of the stroke simulator to an operation of the piston connected to the brake operation element, and thereby improving an operational feeling for the brake operation element by the stroke simulator. Since the simulator accommodation chamber in which the simulator piston is accommodated has the opening portion which is open to the side on which the brake operation element is disposed, the insertion of the simulation piston into the simulator accommodation chamber from the side of the brake operation element becomes easy, thereby improving the assembly of the simulator piston for the simulator accommodation chamber, and thereby improving the assembly of the stroke simulator.

The invention described in claim 2 is the vehicle brake system as set forth in claim 1, wherein the opening portion 64e is covered with a dashboard 2 in a mounted state of the input device 14. According to this aspect, since the opening portion of the stroke simulator is disposed so as to be covered with the dashboard, a structure around the brake operation element is simplified in a vehicle compartment.

The invention described in claim 3 is the vehicle brake system as set forth in claim 1 or claim 2, wherein the stroke simulator 64 includes a receiving member 67 which is held in a simulator housing 64a and receives an input load to the simulation piston 68, the receiving member 67 being held in the simulator housing 64a by a holding unit 69 in a state that the urging members 66a, 66b and the simulator piston 68 are accommodated in the simulator accommodation chamber 64c, and the receiving member 67 being disposed to be prevented by the dashboard 2 from coming off.

According to this aspect, since the simulator piston is maintained in the state of being accommodated in the simulator accommodation chamber by the receiving member held by the holding unit, a mounting work of the input device becomes easy. In addition, since the dashboard has a function of preventing the receiving member from coming off the simulator housing, it is possible by using the dashboard to prevent the receiving member and further the simulator piston from coming off the simulator accommodation chamber.

The invention described in claim 4 is the vehicle brake system as set forth in any one of claims 1 to 3, wherein the urging members 66a, 66b are disposed between the simulator piston 68 and the receiving member 67, and urge the simulator piston 68. According to this aspect, it is possible to allow a stroke of the brake operation element by displacements of the urging members, thereby improving a response to a brake operation and the operational feeling by the urging members.

The invention described in claim 5 is the vehicle brake system as set forth in claim 2 or claim 3, wherein the input device 14 is mounted on the dashboard, and the master cylinder and the stroke simulator are arranged side by side. According to this aspect, it is possible to relatively shorten the hydraulic communication paths, thereby improving the responsiveness of the stroke simulator to the operation of the piston connected to the brake operation element.

The invention described in claim 6 is the vehicle brake system as set forth in claim 5, wherein the input device 14 is attached with a valve unit, and the hydraulic communication paths 58b, 58c are formed inside the input device 14 via the valve unit. According to this aspect, it is possible to relatively shorten the hydraulic communication paths, thereby improving the response of the stroke simulator to the operation of the piston which is connected to the brake operation element.

The invention described in claim 7 is the vehicle brake system as set forth in claim 3, wherein the holding unit is a holding ring 69 which is removable from the simulator housing 64a. The invention described in claim 8 is the vehicle brake system as set forth in claim 7, wherein the receiving member 67 is held with the holding ring 69. According to these aspects, it is possible to hold the receiving member which supports the stroke piston and the urging members by a relatively simple unit, thereby improving the assembly of the stroke simulator.

Advantageous Effects of Invention

According to the present invention, a vehicle brake system including an input device having a stroke simulator is capable of improving the responsiveness of the stroke simulator to the operation of the brake operation element and the operational feeling of the brake operation element by the stroke simulator, and is capable of improving the assembly of the stroke simulator.

DESCRIPTION OF EMBODIMENTS

Next, an embodiment of the present invention will be explained in detail with reference to the accompanying drawings. A vehicle brake system according to an embodiment of the present invention includes an input device and an electric brake actuator as constituent elements which are arranged separately (as separate bodies) from each other. Hereinafter, an overall configuration of the vehicle brake system according to the embodiment of the present invention which is applied to a right-hand drive vehicle will be explained, and then the input device will be further explained in detail.

<Overall Configuration of Vehicle Brake System>

The vehicle brake system according to the embodiment of the present invention, which is configured to have both of a brake-by-wire type brake system and a conventional hydraulic type brake system, will be explained as an example. The brake-by-wire type brake system operates the brake by transmitting electric signals, and the conventional hydraulic type brake system operates the brake by transmitting hydraulic pressure for the purpose of fail-safe. The directions of front, rear, left, and right in the following explanation are with reference to the directions of front, rear, left, and right shown in FIG. 1, which are the same with the directions of front, rear, left, and right of a vehicle.

Figure 1:
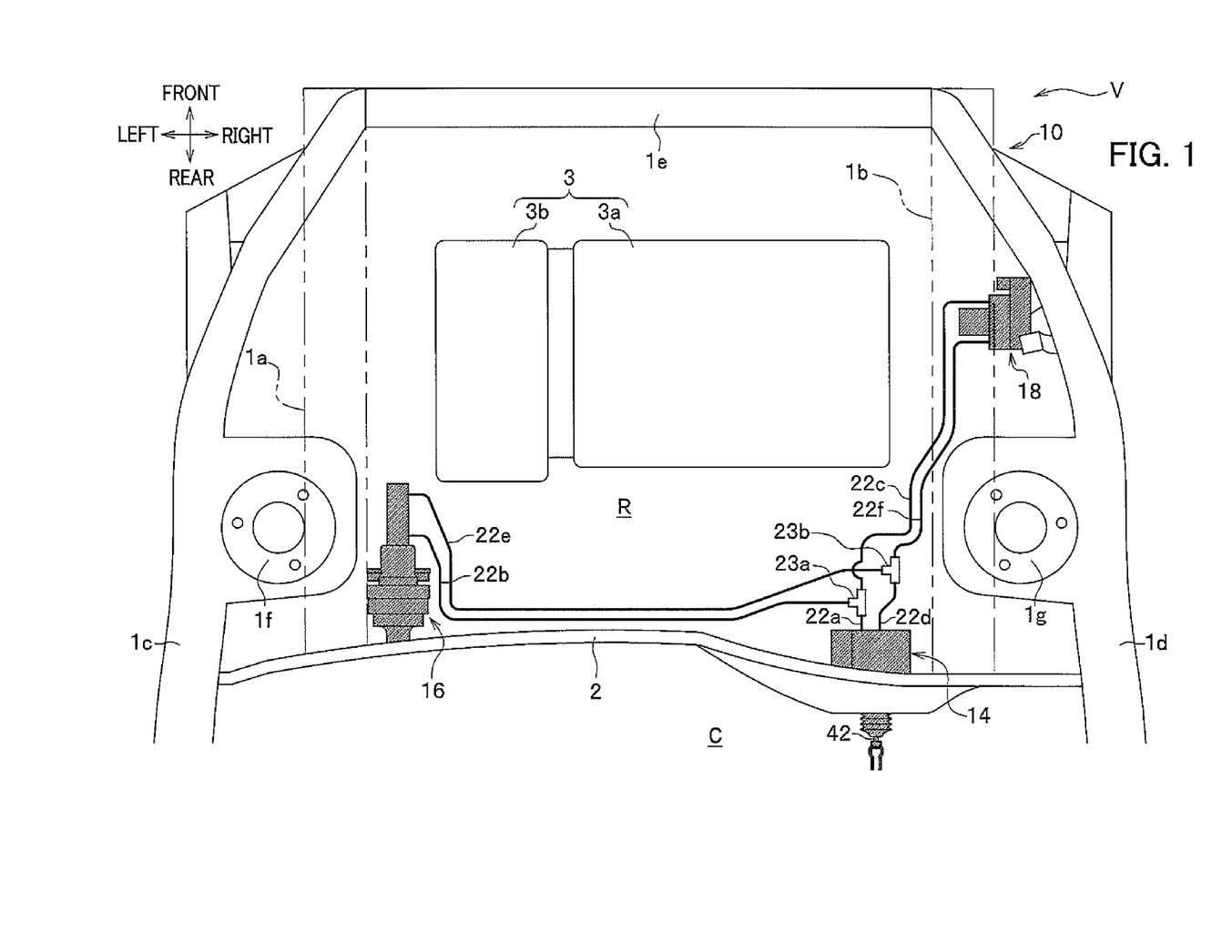
FIG. 1 is a diagram showing an arrangement of a vehicle brake system according to an embodiment of the present invention.

As shown in FIG. 1, a vehicle brake system 10 essentially includes an input device 14 for detecting an operation amount of a brake operation by being inputted the operation amount of a brake pedal 12 operated by an operator, a motor cylinder device (an electric brake actuator) 16 for generating a brake hydraulic pressure at least on the basis of an electric signal according to the operation amount of the brake operation, and a vehicle stability assist device 18 (a vehicle behavior stabilization device, hereinafter referred to as a VSA device 18, VSA; a registered trademark) for assisting a stabilization of a vehicle behavior on the basis of the brake hydraulic pressure generated by the motor cylinder device 16. The vehicle brake system 10 is configured so that the input device 14, the motor cylinder device 16, and the VSA device 18 are arranged in an engine room R of a vehicle V (a car).

The motor cylinder device 16 may further include a unit for generating the hydraulic pressure on the basis of an electric signal according to another physical quantity, in addition to the electric signal according to the brake operation of a driver. The electric signal according to another physical quantity means, for example, a signal for avoiding a collision of the vehicle V not by the brake operation of the driver but by an ECU (Electronic Control Unit) determining a situation in the vicinity of the vehicle V by a sensor or the like, as an automatic brake system.

The engine room R according to the embodiment of the present invention is partitioned in front of the dashboard 2, and is configured to be surrounded by a pair of front side frames 1a, 1b extending along the longitudinal direction of the vehicle V on the left and right sides in the vehicle width direction, a pair of upper members 1c, 1d extending along the longitudinal direction of a vehicle body and being spaced a predetermined distance above the pair of front side frames 1a, 1b, a bulkhead connection body 1e connected to front end portions of the pair of front side frames 1a, 1b and made of substantially rectangular frame constituted by a plurality of members, and damper housings 1f, 1g supporting unillustrated struts on the rear side in the longitudinal direction of the pair of upper members 1c, 1d. The unillustrated struts are configured as front wheel dampers, for example, with coil springs which absorb shocks and shock absorbers which reduce vibrations.

Structures such as a power unit 3 are mounted together with the vehicle brake system 10 in the engine room R. The power unit 3 is, for example, a unit for a hybrid vehicle combined with an engine 3a, an electric motor (a running motor) 3b, and a transmission (not shown), and is arranged in a substantially central portion of the space in the engine room R. The engine 3a and the electric motor 3b are configured to drive the left and right front wheels via an unillustrated power transmission mechanism. An unillustrated high-voltage battery (a lithium ion battery or the like), which supplies the power to the electric motor 3b and is charged the power (the regenerative power) from the electric motor 3b, is mounted beneath the floor of a vehicle compartment C or on the rear of the vehicle compartment C of the vehicle V. The vehicle brake system 10 can be applied to any one of front-wheel drive, rear-wheel drive, and four-wheel drive.

Around the power unit 3 mounted in the engine room R, various kinds of structures (auxiliaries) such as electric systems including a low-voltage battery for supplying an electric power to unillustrated lamps and the like, intake systems, exhaust systems, and cooling systems, are attached in addition to the vehicle brake system 10 which will be described later.

The input device 14 according to the embodiment of the present invention is applied to the right-hand drive vehicle mentioned above, and is secured via stud bolts 303 (see FIG. 3A) to be described later on the right side in the vehicle width direction of the dashboard 2. A push rod 42 connected to the brake pedal (the brake operation element) 12 (see FIG. 3A) is configured to protrude through the dashboard 2 from the side of the engine room R to the side of the vehicle compartment C. The dashboard 2, which is apart of a vehicle body of the vehicle V, separates the vehicle compartment C in which the brake pedal 12 is arranged, from the engine room R which is a space formed in front of the vehicle compartment C, and is a attachment member to which the input device 14 is detachably attached.

The motor cylinder device 16 is arranged on the left side in the vehicle width direction on the opposite side of the input device 14, and mounted, for example, on the left front side frame 1a via an unillustrated bracket. Specifically, the motor cylinder device 16 is resiliently supported (floating) on the bracket, and the bracket is fastened to the front side frame 1a by a fastening member such as a bolt. In this manner, vibrations and the like generated during operation of the motor cylinder device 16 can be absorbed.

The VSA device 18 is configured to include, for example, an ABS (Antilock Brake System) function to prevent wheel lock during braking, a TCS (Traction Control System) function to prevent wheel slip during acceleration, and a function to suppress side slip during turning, and is mounted on the vehicle body on the front side of the right end in the vehicle width direction via a bracket, for example. In place of the VSA device 18, the ABS device having only the ABS (Antilock Brake System) function to prevent wheel lock during braking can be mounted on the vehicle body.

The input device 14, the motor cylinder device 16, and the VSA device 18 are, for example, connected with one another via hydraulic paths made of metallic pipe members, while the input device 14 and the motor cylinder device 16 are electrically connected with each other by an unillustrated wire harness as the brake-by-wire type brake system.

Figure 2:
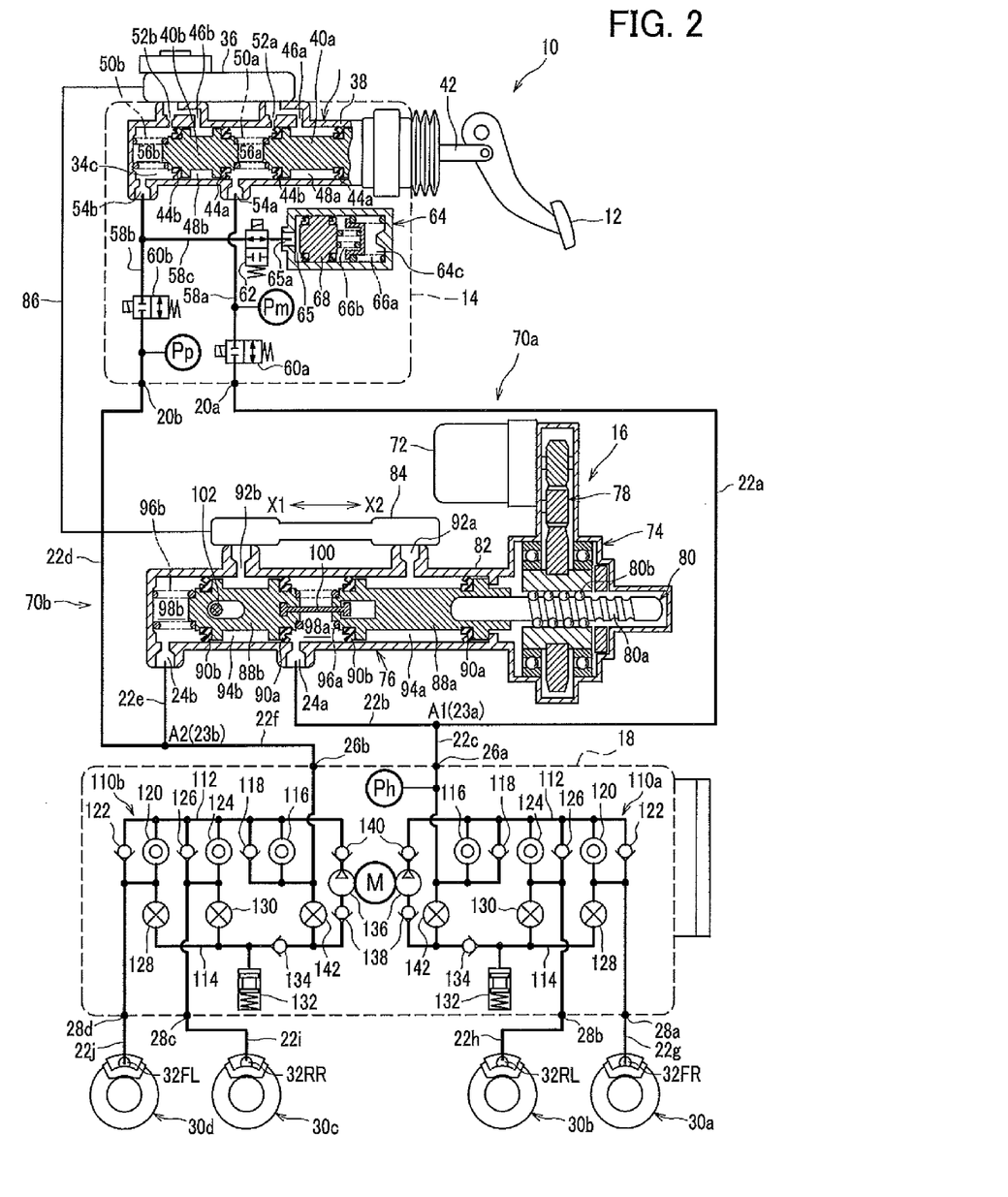
FIG. 2 is a schematic diagram showing a schematic configuration of the vehicle brake system according to the embodiment of the present invention.

Specifically, the input device 14 and the VSA device 18 are connected with each other via a first piping tube 22a, a joint (a three-way branch pipe) 23a, and a third piping tube 22c as a first hydraulic system 70a (see FIG. 2), and are connected with each other via a fourth piping tube 22d, a joint (a three-way branch pipe) 23b, and a sixth piping tube 22f as a second hydraulic system 70b (see FIG. 2).

The motor cylinder device 16 is connected to a joint 23a via a second piping tube 22b as the first hydraulic system 70a (see FIG. 2) and connected to the joint 23b via a fifth piping tube 22e as the second hydraulic system 70b (see FIG. 2).

The hydraulic paths will be described with reference to FIG. 2. With reference to a connection point A1 (the joint 23a) in FIG. 2, a connection port 20a of the input device 14 and the connection point A1 are connected via the first piping tube 22a, and an output port 24a of the motor cylinder device 16 and the connection point A1 are connected via the second piping tube 22b, and further an introduction port 26a of the VSA device 18 and the connection point A1 are connected via the third piping tube 22c.

In addition, with reference to another connection point A2 (the joint 23b) in FIG. 2, another connection port 20b of the input device 14 and the connection point A2 are connected via the fourth piping tube 22d, and another output port 24b of the motor cylinder device 16 and the connection point A2 are connected via the fifth piping tube 22e, and further another introduction port 26b of the VSA device 18 and the connection point A2 are connected via the sixth piping tube 22f.

The VSA device 18 is provided with a plurality of output ports 28a to 28d. A first output port 28a is connected to a wheel cylinder 32FR of a disk brake mechanism 30a provided on the front right wheel via a seventh piping tube 22g. A second output port 28b is connected to a wheel cylinder 32RL of a disk brake mechanism 30b provided on the rear left wheel via an eighth piping tube 22h. A third output port 28c is connected to a wheel cylinder 32RR of a disk brake mechanism 30c provided on the rear right wheel via a ninth piping tube 22i. A fourth output port 28d is connected to a wheel cylinder 32FL of a disk brake mechanism 30d provided on the front left wheel via a tenth piping tube 22j.

In this case, a brake fluid is supplied to each of the wheel cylinders 32FR, 32RL, 32RR, and 32FL of the disk brake mechanisms 30a to 30d via the piping tubes 22g to 22j connected to each of the output ports 28a to 28d. Each of the wheel cylinders 32FR, 32RL, 32RR, and 32FL is operated to apply a braking force to the corresponding wheels (the front right wheel, the rear left wheel, the rear right wheel, and the front left wheel) by each hydraulic pressure being increased in each of the wheel cylinders 32FR, 32RL, 32RR, and 32FL.

The vehicle brake system 10 is provided to be mountable on various vehicles including, for example, a vehicle driven only by an internal combustion engine, an electric vehicle, a fuel cell vehicle, in addition to the hybrid vehicle assumed in the embodiment of the present invention.

The input device 14 integrally includes the brake pedal 12 operated by the driver, the tandem master cylinder 34 capable of generating an operating hydraulic pressure which is a hydraulic pressure based on an input by operations of pistons 40a, 40b in response to an operation of the brake pedal 12, a first reservoir 36 attached to the master cylinder 34, and the stroke simulator 64 integrally provided with the master cylinder 34 while giving a pseudo-operation reaction force of the brake pedal 12 to the brake pedal 12.

In a master cylinder accommodation chamber 34c formed by a cylinder tube 38 of the master cylinder 34, the pistons

40$a$, 40$b$ as two master cylinder pistons, which are spaced a predetermined distance from each other along the axial direction of the cylinder tube 38, are arranged to be slidably accommodated. One piston 40$a$ is disposed in close proximity to the brake pedal 12 and connected to the brake pedal 12 via the push rod 42. The other piston 40$b$ is disposed apart from the brake pedal 12 compared to the piston 40$a$. Therefore, the both pistons 40$a$, 40$b$ operate in conjunction with the operation of the brake pedal 12.

On the outer peripheral surfaces of the one and the other pistons 40$a$, 40$b$, a pair of piston packings 44$a$, 44$b$ is mounted respectively via annular step portions. Between the pair of piston packings 44$a$, 44$b$, back chambers 48$a$, 48$b$ respectively communicating with supply ports 46$a$, 46$b$ to be described later, are formed. One spring member 50$a$ is disposed between the one and the other pistons 40$a$, 40$b$, and the other spring member 50$b$ is disposed between the other piston 40$b$ and the side end portion of the cylinder tube 38. Instead of providing the piston packings 44$a$, 44$b$ on the outer peripheral surfaces of the pistons 40$a$, 40$b$, packings can be provided on the inner peripheral surfaces of the cylinder tube 38.

The cylinder tube 38 of the master cylinder 34 is provided with the two supply ports 46$a$, 46$b$, two relief ports 52$a$, 52$b$, and two output ports 54$a$, 54$b$. In this case, each of the supply ports 46$a$, 46$b$ and each of the relief ports 52$a$, 52$b$ are provided so as to join respectively to communicate with an unillustrated reservoir chamber in the first reservoir 36.

In the cylinder tube 38 of the master cylinder 34, a first pressure chamber 56$a$ and a second pressure chamber 56$b$ which control an operation hydraulic pressure corresponding to a depression force of the brake pedal 12 depressed by the driver (the operator) are provided. The first pressure chamber 56$a$ is provided to communicate with the connection port 20$a$ via a first hydraulic path 58$a$, and the second pressure chamber 56$b$ is provided to communicate with the another connection port 20$b$ via a second hydraulic path 58$b$.

Between the master cylinder 34 and the connection port 20$a$, a pressure sensor Pm is provided on the upstream side of the first hydraulic pressure path 58$a$, while a first shutoff valve 60$a$ made of a normally open type solenoid valve is provided on the downstream side of the first hydraulic pressure path 58$a$. The pressure sensor Pm is adapted to detect a hydraulic pressure on the upstream side closer to the master cylinder 34 than the first shutoff valve 60$a$ on the first hydraulic pressure path 58$a$.

Between the master cylinder 34 and the another connection port 20$b$, a second shutoff valve 60$b$ made of a normally open type solenoid valve is provided on the upstream side of the second hydraulic pressure path 58$b$, while a pressure sensor Pp is provided on the downstream side of the second hydraulic pressure path 58$b$. The pressure sensor Pp is adapted to detect a hydraulic pressure on the downstream side closer to the wheel cylinders 32FR, 32RL, 32RR, and 32FL than the second shutoff valve 60$b$ on the second hydraulic pressure path 58$b$.

"Normally open" at the first shutoff valve 60$a$ and the second shutoff valve 60$b$ means that a normal position (a valving element position when not energized) of the valve is in a state of an open position (normally open). In FIG. 2, the first shutoff valve 60$a$ and the second shutoff valve 60$b$ show states when energized (a third shutoff valve 62 to be described later is also the same).

On the second hydraulic path 58$b$ between the master cylinder 34 and the second shutoff valve 60$b$, a branch hydraulic path 58$c$ branching from the second hydraulic path 58$b$ is provided to be connected in series to a third shutoff valve 62 made of a normally closed type solenoid valve and to the stroke simulator 64. "Normally closed" at the third shutoff valve 62 means that a normal position (a valving element position when not energized) of the valve is in a state of a closed position.

The stroke simulator 64 is a device for generating an operation reaction force and a stroke in response to the operation of the brake pedal 12 when the first shutoff valve 60$a$ and the second shutoff valve 60$b$ are closed. The stroke simulator 64 is provided via the branch hydraulic path 58$c$ and a port 65$a$, the branch hydraulic path 58$c$ branching from the second hydraulic path 58$b$ at a position closer to the master cylinder 34 than the second shutoff valve 60$b$. In other words, the brake fluid which is led out from the second pressure chamber 56$b$ of the master cylinder 34 is supplied to a hydraulic pressure chamber 65 of the stroke simulator 64 via the second hydraulic path 58$b$, the branch hydraulic path 58$c$, and the port 65$a$. Therefore, the stroke simulator 64 absorbs the brake fluid sent out from the master cylinder 34.

Figure 4A:
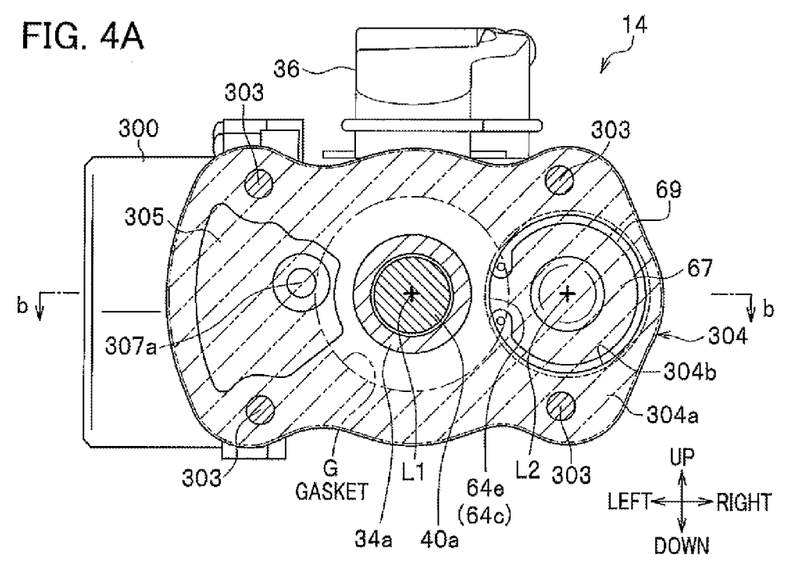
FIG. 4A is a cross-sectional view taken along a line IV-IV in FIG. 3B.
Figure 4B:
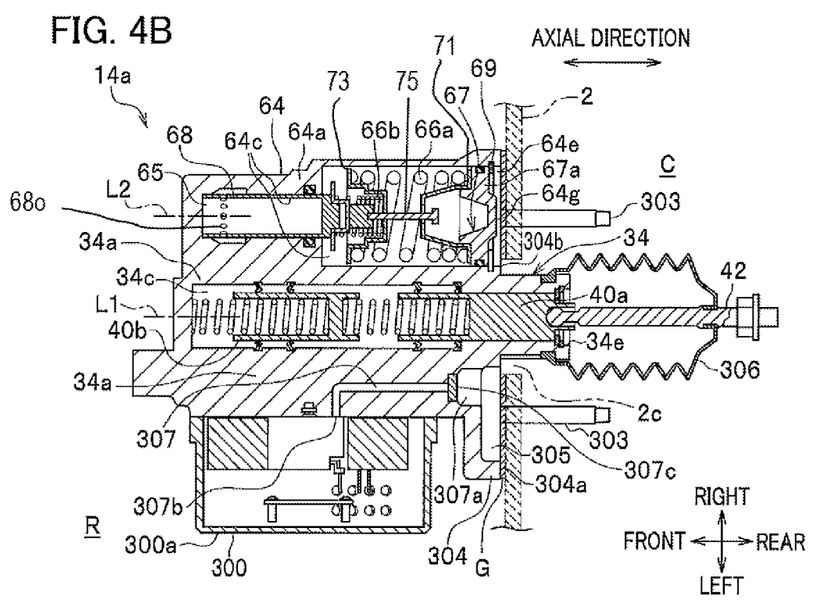
FIG. 4B is a cross-sectional view taken along a line b-b in FIG. 4A.

The stroke simulator 64 is provided with a first simulator spring 66$a$ having a high spring constant and a second simulator spring 66$b$ having a low spring constant which are arranged in series with each other, and a simulator piston 68 which is urged by the first and second simulator springs 66$a$, 66$b$. As shown in FIGS. 4A-4B, the simulator piston 68 has a hollow cylindrical piston body with a plurality of openings 68$o$ formed through a side wall thereof. The stroke simulator 64 also includes a first spring seat 71 abuttingly contacting the receiving member 67, and having a protrusion thereon which fits inside of a first end of the first simulator spring 66$a$. The stroke simulator 64 further includes a second spring seat 73 having a protrusion thereon which fits inside of a second end of the first simulator spring 66$a$, and which receives the second simulator spring 66$b$ therein. As shown in FIG. 4B, the first and second spring seats 71, 73 are operatively connected by a linking member 75 extending between the respective protrusions thereof. Increasing gradient of a pedal reaction force as the operation reaction force is set low during early period of a depression of the brake pedal 12, and the pedal reaction force is set high during late period of the depression of the brake pedal 12, so that the operational feeling for the brake pedal 12 is equivalent to existing master cylinders.

The hydraulic paths are roughly divided into two hydraulic systems. The first hydraulic system 70$a$ connects the first pressure chamber 56$a$ of the master cylinder 34 to the plurality of wheel cylinders 32FR, 32RL, and the second hydraulic system 70$b$ connects the second pressure chamber 56$b$ of the master cylinder 34 to the plurality of wheel cylinders 32RR, 32FL.

The first hydraulic system 70$a$ is configured with the first hydraulic path 58$a$ connecting the output port 54$a$ of the master cylinder 34 (the cylinder tube 38) of the input device 14 to the connection port 20$a$, the piping tubes 22$a$, 22$b$ connecting the connection port 20$a$ of the input device 14 to the output port 24$a$ of the motor cylinder device 16, the piping tube 22$b$, 22$c$ connecting the output port 24$a$ of the motor cylinder device 16 to the introduction port 26$a$ of the VSA device 18, and the piping tubes 22$g$, 22$h$ respectively connecting the output ports 28$a$, 28$b$ of the VSA device 18 to each of the wheel cylinders 32FR, 32RL.

The second hydraulic system 70$b$ includes the second hydraulic path 58$b$ connecting the output port 54$b$ of the master cylinder 34 (the cylinder tube 38) of the input device 14 to the another connection port 20$b$, the piping tubes 22$d$, 22$e$ connecting the another connection port 20$b$ of the input device 14 to the output port 24$b$ of the motor cylinder device 16, the piping tube 22$e$, 22$f$ connecting the output port 24$b$ of the motor cylinder device 16 to the introduction port 26$b$ of the VSA device 18, and the piping tubes 22*i*, 22*j* respectively connecting the output ports 28*c*, 28*d* of the VSA device 18 to each of the wheel cylinders 32RR, 32FL.

As a consequence, by configuring the hydraulic paths with the first hydraulic system 70*a* and the second hydraulic system 70*b*, the wheel cylinders 32FR, 32RL and the wheel cylinders 32RR, 32FL can be operated independently, thereby generating the braking force independently with one another.

The motor cylinder device 16 has an actuator mechanism 74 including an electric motor 72, and a cylinder mechanism 76 urged by the actuator mechanism 74.

The actuator mechanism 74 is disposed on the output shaft side of the electric motor 72, and has a gear mechanism (a deceleration mechanism) 78 and a ball screw structure 80. The gear mechanism 78 transmits a rotational driving force of the electric motor 72 by meshing a plurality of gears, and the ball screw structure 80 includes a ball screw shaft 80*a* and balls 80*b* which reciprocate along the axial direction by transmitting the rotational driving force via the gear mechanism 78.

The cylinder mechanism 76 has a substantially cylindrical cylinder body 82 and a second reservoir 84 attached to the cylinder body 82. The second reservoir 84 is provided to be connected to the first reservoir 36 attached to the master cylinder 34 of the input device 14 via a piping tube 86, so that the brake fluid stored in the first reservoir 36 is supplied to the second reservoir 84 via the piping tube 86.

In the cylinder body 82, a first slave piston 88*a* and a second slave piston 88*b*, which are spaced a predetermined distance from each other along the axial direction of the cylinder body 82, are arranged slidably. The first slave piston 88*a* is arranged in close proximity to the side of the ball screw structure 80, and is in contact with one end portion of the ball screw shaft 80*a* to be displaced in the direction of an arrow X1 or an arrow X2 integrally with the ball screw shaft 80*a*. The second slave piston 88*b* is arranged spaced from the side of the ball screw structure 80 compared to the first slave piston 88*a*.

On the outer peripheral surfaces of the first and second slave pistons 88*a*, 88*b*, a pair of slave piston packings 90*a*, 90*b* is mounted respectively via annular step portions. Between the pair of slave piston packings 90*a*, 90*b*, a first back chamber 94*a* and a second back chamber 94*b* respectively communicating with reservoir ports 92*a*, 92*b* to be described later, are formed. A first return spring 96*a* is arranged between the first and second slave pistons 88*a*, 88*b*, and a second return spring 96*b* is arranged between the second slave piston 88*b* and the side end portion of the cylinder body 82.

The cylinder body 82 of the cylinder mechanism 76 is provided with the two reservoir ports 92*a*, 92*b* and the two output ports 24*a*, 24*b*. In this case, the reservoir ports 92*a*, 92*b* are provided to communicate with an unillustrated reservoir chamber in the second reservoir 84.

In addition, a first hydraulic pressure chamber 98*a* and a second hydraulic pressure chamber 98*b* are provided in the cylinder body 82. The first hydraulic pressure chamber 98*a* controls the brake hydraulic pressure which is outputted from the output port 24*a* to the side of the wheel cylinders 32FR, 32RL, and the second hydraulic pressure chamber 98*b* controls the brake hydraulic pressure which is outputted from the another output port 24*b* to the side of the wheel cylinders 32RR, 32FL.

Between the first slave piston 88*a* and the second slave piston 88*b*, a regulation unit 100 for regulating maximum strokes (maximum displacement distances) and minimum strokes (minimum displacement distances) of the first slave piston 88*a* and the second slave piston 88*b* is provided. Further, on the second slave piston 88*b*, a stopper pin 102 for regulating a sliding range of the second slave piston 88*b* to prevent over-return to the side of the first slave piston 88*a* is provided. In this manner, when one system fails, a failure in the other system is prevented, particularly during backup time when braking by the brake hydraulic pressure generated in the master cylinder 34.

The VSA device 18 is made of well known components, and includes a first brake system 110*a* for controlling the first hydraulic system 70*a* connected to the disk brake mechanisms 30*a*, 30*b* (the wheel cylinders 32FR, 32RL) of the front right wheel and the rear left wheel, and a second brake system 110*b* for controlling the second hydraulic system 70*b* connected to the disk brake mechanisms 30*c*, 30*d* (the wheel cylinders 32RR, 32FL) of the rear right wheel and the front left wheel. Here, the first brake system 110*a* may be a hydraulic system connected to the disk brake mechanisms mounted on the front left wheel and the front right wheel, and the second brake system 110*b* may be a hydraulic system connected to the disk brake mechanisms mounted on the rear left wheel and the rear right wheel. Further, the first brake system 110*a* may be a hydraulic system connected to the disk brake mechanisms mounted on the front right wheel and the rear right wheel on one side of the vehicle body, and the second brake system 110*b* may be a hydraulic system connected to the disk brake mechanisms mounted on the front left wheel and the rear left wheel on the other side of the vehicle body.

Since the first brake system 110*a* and the second brake system 110*b* have the same structures respectively, those corresponding to each other in the first brake system 110*a* and in the second brake system 110*b* are given the same reference numerals, and explanations will be focused on the first brake system 110*a* and explanations of the second brake system 110*b* will be appended in parentheses.

The first brake system 110*a* (the second brake system 110*b*) includes a first common hydraulic path 112 and a second common hydraulic path 114, which are common to the wheel cylinders 32FR, 32RL (32RR, 32FL). The VSA device 18 includes a regulator valve 116, a first check valve 118, a first inlet valve 120, a second check valve 122, a second inlet valve 124, and a third check valve 126. The regulator valve 116 is made of a normally open type solenoid valve disposed between the introduction port 26*a* and the first common hydraulic path 112. The first check valve 118 is disposed in parallel with the regulator valve 116, and allows the brake fluid to flow from the side of the introduction port 26*a* to the side of the first common hydraulic path 112 (prevents the brake fluid from flowing to the side of the introduction port 26*a* from the side of the first common hydraulic path 112). The first inlet valve 120 is made of a normally open type solenoid valve disposed between the first common hydraulic path 112 and the first output port 28*a*. The second check valve 122 is disposed in parallel with the first inlet valve 120, and allows the brake fluid to flow from the side of the first output port 28*a* to the side of the first common hydraulic path 112 (prevents the brake fluid from flowing to the side of the first output port 28*a* from the side of the first common hydraulic path 112). The second inlet valve 124 is made of a normally open type solenoid valve disposed between the first common hydraulic path 112 and the second output port 28*b*. The third check valve 126 is disposed in parallel with the second inlet valve 124, and allows the brake fluid to flow from the side of the second output port 28*b* to the side of the first common hydraulic path 112 (prevents the brake fluid from flowing to the side of the second output port 28b from the side of the first common hydraulic path 112).

Further, the VSA 18 includes a first outlet valve 128, a second outlet valve 130, a reservoir 132, a fourth check valve 134, a pump 136, an intake valve 138, a discharge valve 140, a motor M, and a suction valve 142. The first outlet valve 128 is made of a normally closed type solenoid valve disposed between the first output port 28a and the second common hydraulic path 114. The second outlet valve 130 is made of a normally closed type solenoid valve disposed between the second output port 28b and the second common hydraulic path 114. The reservoir 132 is connected to the second common hydraulic path 114. The fourth check valve 134 is disposed between the first common hydraulic path 112 and the second common hydraulic path 114, and allows the brake fluid to flow from the side of the second common hydraulic path 114 to the side of the first common hydraulic path 112 (prevents the brake fluid from flowing to the side of the second common hydraulic path 114 from the side of the first common hydraulic path 112). The pump 136 is disposed between the fourth check valve 134 and the first common hydraulic path 112, and supplies the brake fluid from the side of the second common hydraulic path 114 to the side of the first common hydraulic path 112. The intake valve 138 and the discharge valve 140 are disposed respectively before and after the pump 136 driven by the motor M. The suction valve 142 is disposed between the second common hydraulic path 114 and the introduction port 26a.

In the first brake system 110a, a pressure sensor Ph for detecting the brake fluid pressure which is outputted from the output port 24a of the motor cylinder device 16 and controlled in the first hydraulic pressure chamber 98a of the motor cylinder device 16, is disposed on the hydraulic path adjacent to the introduction port 26a. Detection signals detected by each of the pressure sensors Pm, Pp, and Ph are introduced into an unillustrated control unit.

<Input Device>

Figure 3A:
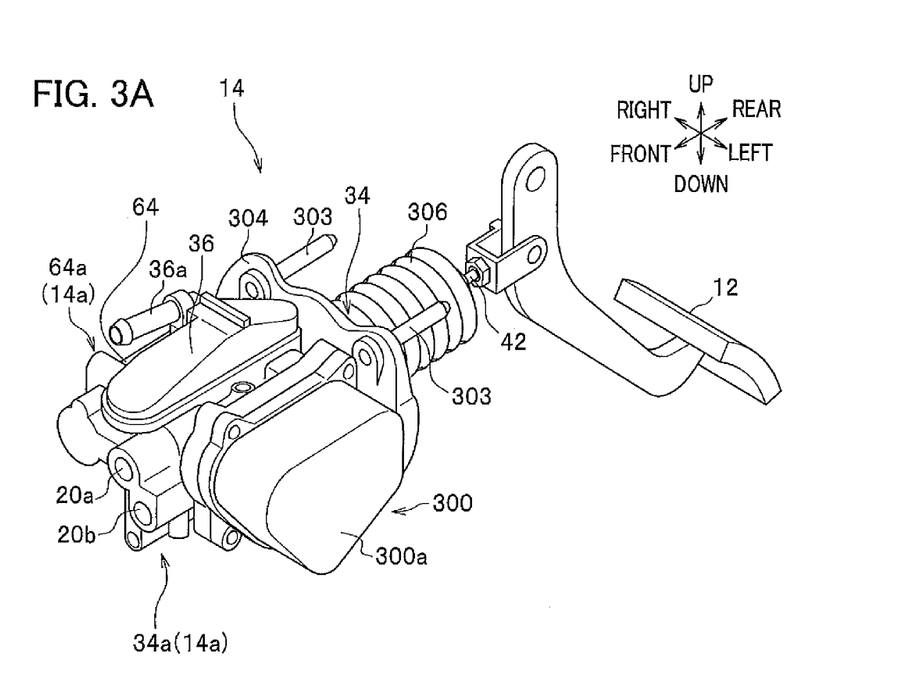
FIG. 3A is an overall perspective view of an input device according to the embodiment of the present invention.
Figure 3B:
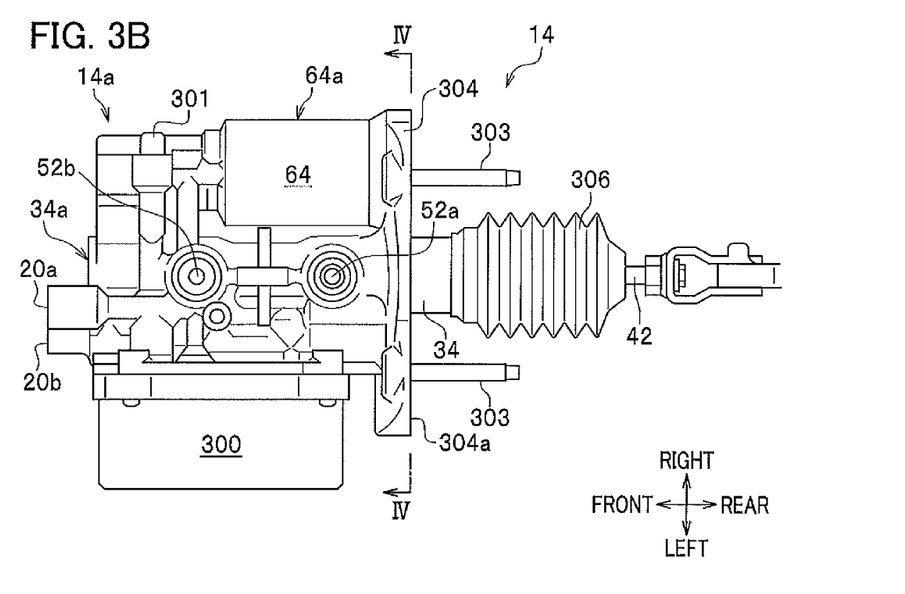
FIG. 3B is a plan view of the input device according to the embodiment of the present invention.

Next, the input device 14 of the vehicle brake system 10 will be explained in more detail. FIG. 3A is an overall perspective view of the input device, and FIG. 3B is a plan view of the input device according to the embodiment of the present invention. However, the first reservoir and the brake pedal in FIG. 3A are omitted in FIG. 3B for convenience of drawing. FIG. 4A is a cross-sectional view taken along a line IV-IV in FIG. 3B, and FIG. 4B is a cross-sectional view taken along a line b-b in FIG. 4A.

As shown in FIGS. 3A and 3B, the master cylinder 34 extends in the longitudinal direction of the vehicle V (see FIG. 1), while the stroke simulator 64 is arranged in parallel integrally with the master cylinder 34. The stroke simulator 64 is arranged side by side on the right side (the outside in the vehicle width direction) of the master cylinder 34. A master cylinder housing 34a of the master cylinder 34 and a simulator housing 64a of the stroke simulator 64 according to the present embodiment are integrally formed of a molding material (for example, a metal), by casting in this case, to construct a housing 14a of the input device 14.

The housing 14a includes a mounting plate 304 which is a mounting portion for mounting the input device 14 on the dashboard 2. The mounting plate 304 having a mounting surface 304a facing the dashboard 2 is the mounting portion which the master cylinder housing 34a and the simulator housing 64a have for mounting the master cylinder 34 and the stroke simulator 64 on the dashboard 2. The housing 14a is reduced in weight by providing a hollow portion 305 (see FIGS. 4A and 4B) which forms a concave portion on the mounting surface 304a.

Above the master cylinder 34 and the stroke simulator 64, the first reservoir 36 (see FIG. 3A) having an elongated outline is disposed to extend in the longitudinal direction between the master cylinder 34 and the stroke simulator 64. The first reservoir 36 and the master cylinder 34 are adapted to communicate with the first and second pressure chambers 56a, 56b and the back chambers 48a, 48b shown in FIG. 2 via a connection port which is formed so as to face the relief ports 52a, 52b shown in FIG. 3B and the supply ports 46a, 46b (see FIG. 2) not shown in FIG. 3B. In FIG. 3A, a reference numeral 36a is a connector to be connected with a base end of the piping tube 86 which has the first reservoir 36 communicate with the second reservoir 84 shown in FIG. 2. The connector 36a is made of a tubular member protruding in front of the input device 14.

As shown in FIGS. 3A and 3B, a first connection port 20a and a second connection port 20b are provided on the front side of the master cylinder housing 34a constituting the cylinder tube 38 (see FIG. 2). The first connection port 20a is connected with a base end of the first piping tube 22a which is extended toward the joint 23a shown in FIG. 1, and the second connection port 20b is connected with a base end of the fourth piping tube 22d which is extended toward the joint 23b shown in FIG. 1. As shown in FIGS. 3A and 3B, a bleeder 301 for air venting and a sensor valve unit 300 as a components storage box, which will be described later, are provided respectively on the right side and on the left side of the input device 14. The "sensor valve unit" corresponds to a "sensor unit" and a "valve unit".

As shown in FIGS. 3A and 3B, on the rear side of the input device 14, a rear end portion of the master cylinder 34 extends further rearward from the mounting plate 304. As described above, the rear end portion of the master cylinder 34 is configured to accept one end of the push rod 42 having the other end which is connected to the brake pedal 12 (see FIG. 2). In FIGS. 3A and 3B, a reference numeral 306 is a boot which is disposed over the master cylinder 34 and the push rod 42. The input device 14 is secured to the dashboard 2 (see FIG. 1) via four stud bolts 303 extending rearward from the mounting plate 304, and in this case apart of the master cylinder 34 extending rearward from the mounting plate 304 extends into the vehicle compartment C (see FIG. 1) through the dashboard 2. Incidentally, the input device 14 according to the present embodiment is mounted to be inclined according to the inclination of the dashboard 2 at the mounted position so that the axial direction of the master cylinder 34 is inclined with a gradient rising toward the front of the vehicle V.

Next, about the structure of the input device 14, the master cylinder 34 and the stroke simulator 64 will be further explained mainly with reference to FIGS. 3A and 3B, FIGS. 4A and 4B, and appropriately with reference to FIG. 1 and FIG. 2. As shown in FIGS. 4A and 4B, the stroke simulator 64 includes the simulator housing 64a, the first and second simulator springs 66a, 66b, the simulator piston 68, and a plug 67. The simulator housing 64a has the mounting plate 304. The first and second simulator springs 66a, 66b are a first and second resilient members as a reaction force source which generates an operation reaction force of the brake pedal 12 on the basis of an input load from the brake pedal 12. The simulator piston 68 is accommodated without being constrained by the brake pedal 12 (i.e., without being connected mechanically) in the simulator accommodation chamber 64c formed by the simulator housing 64a. The plug 67 is held in the simulator housing 64a as a receiving member for receiving the input load to the simulator piston 68. As described above, it is preferable on the structure of the input device 14 that there are less restrictions by the brake pedal 12 such as a connection with the brake pedal 12, in order to increase a degree of freedom of a layout of the stroke simulator 64 by increasing a degree of freedom of an arrangement of the stroke simulator 64.

The simulator piston 68 is movable in the simulator accommodation chamber 64c to reciprocate in the axial direction of the simulator piston 68 against a spring force which is an urging force of the first and second simulator springs 66a, 66b as the urging members, by being driven by the operation hydraulic pressure generated by the master cylinder 34. Here, the axial direction is a direction parallel to an axis L2 (which is also an axis of the simulator accommodation chamber 64c) of the simulator piston 68. As viewed from the axial direction, an entire opening portion 64e, the entire plug 67, and the entire stroke simulator 64 are covered by the dashboard 2 from the side of the brake pedal 12 (i.e., the side of the vehicle compartment C) disposed relative to the dashboard 2 in the mounted state that the input device 14 is mounted on the dashboard 2.

The simulator accommodation chamber 64c has the opening portion 64e which enables the simulator piston 68 to be inserted into the simulator chamber 64c in the axial direction from the side of the brake pedal 12 disposed relative to the dashboard 2 in the axial direction. The opening portion 64e opens toward the dashboard 2 in the axial direction. The plug 67 for sealing a clearance between the simulator housing 64a and the simulator piston 68 is held with the holding ring 69 as the holding unit applied to the simulator housing 64a, and is held by the simulator housing 64a in the vicinity of the opening portion 64e, in the state that the simulator springs 66a, 66b and the simulator piston 68 are accommodated in the simulator chamber 64c. The holding ring 69 is removably mounted on the simulator housing 64a. The simulator springs 66a, 66b and the simulator piston 68 are prevented from coming off the simulator chamber 64c by the plug 67.

The input device 14 is mounted on the dashboard 2 at the position capable of preventing the plug 67 from coming off the simulator housing 64a, so that the plug 67 can be disposed to be prevented from coming off by the dashboard 2. Therefore, the plug 67 of the stroke simulator 64 and the dashboard 2 are arranged at a position facing each other in the axial direction. In the state that the plug 67 is held by the holding ring 69, in the axial direction between the plug 67 and a gasket G provided on the dashboard 2 as well as an opening edge portion 304b (which is a part of the mounting surface 304a) forming the opening portion 64e, is formed an axial direction gap 64g thinner than the thickness in the axial direction of an outer peripheral portion 67a which is a part of plug 67 and located in the simulator accommodation chamber 64c. The simulator springs 66a, 66b and the simulator piston 68 are prevented from coming off the simulator accommodation chamber 64c by the plug 67 being prevented from coming off.

The master cylinder accommodation chamber 34c formed by the master cylinder housing 34a has an opening portion 34e which enables the insertion of the simulator piston 68 into the master cylinder accommodation chamber 34c from the side of the vehicle compartment C in the axial direction which is a direction parallel to an axis L1 (which is also an axis of the master cylinder accommodation chamber 34c) of the pistons 40a, 40b. The master cylinder accommodation chamber 34c and the simulator accommodation chamber 64c are formed in parallel to the axial direction relative to the dashboard 2, and the opening portion 34e of the master cylinder accommodation chamber 34c is open toward the same direction as the opening portion 64e in the axial direction, to be located in the vehicle compartment C.

The second hydraulic path 58b and the branch hydraulic path 58c which connect the respective ports 54b, 65a of the master cylinder 34 and the stroke simulator 64 with each other, constitute the hydraulic communication paths which communicate the master cylinder 34 with the stroke simulator 64, and are formed to extend toward the respective sides from the master cylinder 34 and the stroke simulator 64.

As shown in FIG. 2 and FIG. 3B, the bleeder 301 for air venting is branched from the branch hydraulic path 58c connected to the port 65a of the stroke simulator 64, extended to just above the port 65a, and configured by a plug which is disposed so as to close an opening of a passage facing the outside of the stroke simulator 64. The bleeder 301 is intended to vent the remaining air in the master cylinder 34, the stroke simulator 64, the hydraulic paths, and the like, when filling the brake fluid into the master cylinder 34 and the stroke simulator 64.

As shown in FIGS. 4A, 4B, the housing 14a of the input device 14 is mounted on the dashboard 2 via the gasket G. The gasket G is configured to enclose the outer peripheral of the mounting surface 304a which is an opposing surface of the mounting plate 304 which faces the dashboard 2. In more detail, the gasket G has an outer contour substantially the same as the mounting surface 304a facing the dashboard 2, and the center portion of the gasket G is cut out in a circle with a diameter larger than the outer diameter of the master cylinder 34. A part of the hollow portion 305 and a part of the opening portion 64e face the cut-out portion.

The housing 14a is mounted on the dashboard 2 via such a gasket G, so that a part of the master cylinder 34 extends into the vehicle compartment C. The master cylinder 34 according to the present embodiment is disposed to form a gap 2c between itself and the dashboard 2. Incidentally, the hollow portion 305 which will be described later is in communication with the inside of the vehicle compartment C via the gap 2c.

In FIG. 4A, a reference numeral 36 is the first reservoir, reference numerals 303 are the stud bolts, a reference numeral 300 is the sensor valve unit, a reference numeral 305 is the hollow portion provided on the mounting plate 304, a reference numeral 307a is an opening of a ventilation hole 307 (see FIG. 4B) which will be described later, and a reference numeral 42 in FIG. 4B is the push rod (shown by a fracture surface in FIG. 4B). The first, second, and third shutoff valves 60a, 60b, 62, and the pressure sensors Pm, Pp shown in FIG. 2 will be explained below as well as the sensor valve unit 300.

The sensor valve unit 300 is attached to the housing 14a as shown in FIG. 4B, and disposed side by side with the master cylinder 34 on the left side (the inside in the vehicle width direction of the vehicle V in FIG. 1) of the master cylinder 34. The sensor valve unit 300 includes a housing 300a and those arranged in the housing 300a, wherein those are a pressure sensor mechanism, a valve mechanism, a circuit substrate connected electrically to these mechanisms, and the like.

The pressure sensor mechanism includes the pressure sensors Pm, Pp shown in FIG. 2, and there is no limitation to the pressure sensor mechanism as far as it can detect a hydraulic pressure in the first hydraulic path 58a on the upstream side of the first shutoff valve 60a, and a hydraulic pressure in the second hydraulic path 58b on the downstream side of the second shutoff valve 60b. As a specific example of such a pressure sensor mechanism, for example, there is a pressure sensor mechanism including plungers, the pressure sensors Pm, Pp, and the circuit substrate. The plungers are inserted into monitor holes (not shown) which are drilled in the housing 14a from the side of the sensor valve unit 300 so as to face each of the first hydraulic path 58a and the second hydraulic path 58b, where the hydraulic pressures are measured. The pressure sensors Pm, Pp are disposed at the tip ends of the plungers. The circuit substrate is equipped with a pressure detection circuit which is connected electrically to the pressure sensors Pm, Pp, and calculates the hydraulic pressures by processing the detection signals electrically.

There is no limitation to the valve mechanism, as far as it has the functions of the first, second, and third shutoff valves 60a, 60b, 62. As such a valve mechanism, for example, there is a valve mechanism including rod-shaped valving elements, coils, the circuit substrate, and a power source. The rod-shaped valving elements have tip portions inserted into through holes which are drilled in the housing 14a from the side of the sensor valve unit 300 so as to cross each of the first and second hydraulic paths 58a, 58b, and the branch hydraulic path 58c. The coils reciprocate the rod-shaped valving elements in the through holes by electromagnetic induction. The circuit substrate is equipped with a control circuit which is connected electrically to the coils, and controls timings of reciprocation of the rod-shaped valving elements. The power source supplies a power to the coils via the circuit substrate. In the present embodiment, the input device 14 including the sensor valve unit 300 which incorporates the pressure sensor mechanism and the valve mechanism is assumed, however, all components which can be attached to the master cylinder 34 and the stroke simulator 64 are included in the aforementioned "components to be attached" in the present invention.

As shown in FIG. 4B, the ventilation hole 307 having one end which faces the inside of the housing 300a of the sensor valve unit 300 is formed in the solid portion of the housing 14a. As shown in FIG. 4B, the ventilation hole 307 extends rearward in the solid portion of the housing 14a (extends rearward along with the axial direction of the master cylinder 34) in the middle of extending against the axial direction of the master cylinder 34 from the side of the sensor valve unit 300, and has the other end which faces the inside of the mounting surface 304a of the input device 14 mounted on the dashboard 2.

The other end of the ventilation hole 307 faces the hollow portion 305 formed on the mounting plate 304. In other words, the ventilation hole 307 is constituted by a communication hole which connects the opening 307b formed in the housing 300a of the sensor valve unit 300 to the opening 307a formed in the hollow portion 305. Incidentally, the hollow portion 305 according to the present embodiment is formed by casting out when the housing 14a is cast. The opening 307a formed in the hollow portion 305 is formed near the master cylinder 34, as shown in FIG. 4A. In addition, a waterproof ventilation member 307c (for example, Gore-Tex (a registered trademark)) is disposed inside the opening 307a.

The vehicle brake system 10 is constructed essentially as described above, and the operational effects thereof will be explained below. In the normal state in which the vehicle brake system 10 works properly, the first shutoff valve 60a and the second shutoff valve 60b made of normally open type solenoid valves are in the closed valve state by energization, and the third shutoff valve 62 made of a normally closed type solenoid valve is in the open valve state by energization. Therefore, the brake hydraulic pressure generated by the master cylinder 34 of the input device 14 is not transmitted to the wheel cylinders 32FR, 32RL, 32RR, 32FL of the disk brake mechanisms 30a to 30d, because the first hydraulic system 70a and the second hydraulic system 70b are shut off by the first shutoff valve 60a and the second shutoff valve 60b.

In this case, the brake hydraulic pressure generated in the second pressure chamber 56b of the master cylinder 34 is transmitted to the hydraulic pressure chamber 65 of the stroke simulator 64 via the branch hydraulic path 58c and the third shutoff valve 62 in the open valve state. By the brake hydraulic pressure supplied to the hydraulic pressure chamber 65, the simulator piston 68 is displaced against the spring force of the simulator springs 66a, 66b, so that a stroke of the brake pedal 12 is allowed while a pseudo-pedal reaction force is generated to be applied to the brake pedal 12. As a consequence, a brake feeling which is not uncomfortable for the driver is obtained.

In such a state of the brake system, upon detecting the depression of the brake pedal 12 by the driver, the unillustrated control unit drives the electric motor 72 of the motor cylinder device 16 to urge the actuator mechanism 74, and displaces the first slave piston 88a and the second slave piston 88b toward the direction of the arrow X1 in FIG. 2, against the spring force of the first return spring 96a and the second return spring 96b. By the displacement of the first slave piston 88a and the second slave piston 88b, the brake fluid in the first hydraulic pressure chamber 98a and the brake fluid in the second hydraulic pressure chamber 98b are pressurized to be balanced with each other, thereby generating an intended brake hydraulic pressure.

The brake fluid pressure in the first hydraulic pressure chamber 98a and the second hydraulic pressure chamber 98b of the motor cylinder device 16 are transmitted to the wheel cylinders 32FR, 32RL, 32RR, 32FL of the disk brake mechanisms 30a to 30d via the first and second inlet valves 120, 124 in the open valve state of the VSA device 18, and an intended brake force is applied to each of the wheels by the operations of the wheel cylinders 32FR, 32RL, 32RR, 32FL.

In other words, in the normal state in which the motor cylinder device 16 functioning as a power hydraulic pressure source, the unillustrated ECU performing a by-wire control, and the like are operational, the brake system of so-called brake-by-wire type is active in the vehicle brake system 10. The brake system of brake-by-wire type activates the disk brake mechanisms 30a to 30d by the brake hydraulic pressure generated by the motor cylinder device 16, in a state that the communication of the master cylinder 34, which generates the brake fluid pressure by the brake pedal 12 depressed by the driver, with the disk brake mechanisms 30a to 30d (wheel cylinders 32FR, 32RL, 32RR, 32FL), which brakes each of the wheels, is shut off by the first shutoff valve 60a and the second shutoff valve 60b. Therefore, the present embodiment is suitably applied to, for example, a vehicle V such as an electric vehicle which has no negative pressure by a combustion engine that has been used conventionally.

On the other hand, in the abnormal state in which the motor cylinder device 16 and the like are inoperative, the conventional brake system of so-called hydraulic type is active. The brake system of hydraulic type activates the disk brake mechanisms 30a to 30d (wheel cylinders 32FR, 32RL, 32RR, 32FL) by transmitting the operation hydraulic pressure generated by the master cylinder device 34 as the brake hydraulic pressure to the disk brake mechanisms 30a to 30d (wheel cylinders 32FR, 32RL, 32RR, 32FL), while rendering the first shutoff valve 60a and the second shutoff valve 60b respectively in the open valve states and the third shutoff valve 62 in the closed valve state.

As described above, according to the vehicle brake system 10, since the input device 14, the motor cylinder device (the electric brake actuator) 16, and the VSA device (the vehicle behavior stabilization device) 18 are arranged to be separated with one another in the engine room (the mounting room of the power unit) R, it is possible to reduce each size of the input device 14, the motor cylinder device 16, and the VSA device 18 and to increase the degree of freedom in a layout.

Since the structures such as electric systems, intake systems, exhaust systems, and cooling systems are mounted in addition to the power unit 3 in the engine room R, it is inevitably difficult to ensure a large empty space (mounting space). By configuring the input device 14, the motor cylinder device 16, and the VSA device 18 to be separated from one another like the present embodiment, the size of the individual devices (the input device 14, the motor cylinder device 16, and the VSA device 18) can be reduced, and there is no need to secure a large empty space. In this manner, each of the devices can be mounted even in a small empty space in the engine room R, and the layout is facilitated.

According to the vehicle brake system 10, since the input device 14, the motor cylinder device 16, and the VSA device 18 are configured to be separated from one another, the conventional products are easily used for parts of each of the devices (the input device 14, the motor cylinder device 16, and the VSA device 18).

According to the vehicle brake system 10, since the input device 14 is secured to the dashboard 2, and the motor cylinder device 16 is disposed apart from the input device 14, it can be prevented to bring a feeling of strangeness (an uncomfortable feeling) to the driver by noises and vibrations, because it is possible to arrange the motor cylinder device 16, which may be a source of the noises and the vibrations, apart from the driver.

According to the vehicle brake system 10, since the empty space is seldom formed to be one-sided to the right side or the left side in the vehicle width direction in the engine room R, it is easy to ensure the empty space for arranging the motor cylinder device 16 and the VSA device 18 by arranging the motor cylinder device 16 and the VSA device 18 on the opposite sides with each other in the vehicle width direction, and the layout is facilitated.

The input device 14 of the vehicle brake system 10 is integrally formed to include a master cylinder 34 and a stroke simulator 64. The master cylinder 34 generates the operation hydraulic pressure in response to an input by operations of the pistons 40a, 40b according to the operation of the brake pedal 12. The stroke simulator 64 is integrally provided with the master cylinder 34, and communicates with the master cylinder 34 via the second hydraulic path 58b and the branch hydraulic path 58c. The stroke simulator 64 includes the simulator housing 64a, the simulator springs 66a, 66b, and a simulator piston 68. The simulator housing 64a has the mounting plate 304 for mounting the input device 14 detachably to the dashboard 2. The simulator springs 66a, 66b generates the spring force which is the operation reaction force against the input load from the brake pedal 12. The simulator piston 68 is accommodated in the simulator accommodation chamber 64c without being constrained by the brake pedal 12. And the simulator piston 68 is movable against the spring force in the simulator accommodation chamber 64c by being driven by the operation hydraulic pressure from the master cylinder 34. The simulator chamber 64c has the opening portion 64e which enables the insertion of the simulator piston 68 into the simulator accommodation chamber 64c from the side on which the brake pedal 12 is disposed relative to the dashboard 2 in the axial direction of the simulator piston 68.

According to this structure, since the input device 14 is provided with the master cylinder housing 34a and the simulator housing 64a integrally, it is possible to shorten the second hydraulic path 58b and the branch hydraulic path 58c which have the master cylinder 34 communicate with the stroke simulator 64, thereby making it possible to improve the response of the stroke simulator 64 against the operation of the brake pedal 12, and to improve the operational feeling of the brake pedal 12 by the stroke simulator 64.

Since the simulator accommodation chamber 64c accommodating the simulator piston 68 has the opening portion 64e which is open to the side on which the brake pedal 12 is disposed relative to the dashboard 2, it is easy to insert the simulator piston 68 and the simulator springs 66a, 66b into the simulator accommodation chamber 64c from the side of the brake pedal 12, thereby improving the assembly of the simulator piston 68 and the simulator springs 66a, 66b for the simulator housing 64a, and thereby improving the assembly of the stroke simulator 64. Since the displacement of the simulator piston 68 is not constrained by the brake pedal 12, the constraint for the layout of the stroke simulator 64 in the input device 14 by the position of the brake pedal 12 is reduced, thereby making it possible to increase the degree of freedom of the layout of the stroke simulator 64 in the input device 14.

In the mounted state of the input device 14 on the dashboard 2, when viewed from the axial direction, since the entire opening portion 64e of the stroke simulator 64, the entire plug 67, and the entire stroke simulator 64 are covered by the dashboard 2 from the side on which the brake pedal 12 is disposed relative to the dashboard 2, the structure around the brake pedal 12 is simplified in the vehicle compartment C.

The stroke simulator 64 has the plug 67 which is held in the simulator housing 64a to receive the input load to the simulator piston 68, and the plug 67 is held in the simulator housing 64a by the holding ring 69 provided in the simulator housing 64a, in the state that the simulator springs 66a, 66b and the simulator piston 68 are accommodated in the simulator accommodation chamber 64c. According to this structure, since the simulator springs 66a, 66b and the simulator piston 68 are maintained in a state of being accommodated in the simulator accommodation chamber 64c by the plug 67 which is held by the holding ring 69, the mounting work of the input device 14 on the dashboard 2 is facilitated.

The plug 67 is disposed so as not to come off the simulator housing 64a by the dashboard 2. According to this structure, since the dashboard 2 has a function to prevent the plug 67 from coming off the simulator housing 64a, it is possible to prevent the simulator springs 66a, 66b and the simulator piston 68 as well as the plug 67 from coming off the simulator accommodation chamber 64c by using the dashboard 2.

The input device 14 has the housing 14a which is formed integrally with the master cylinder housing 34a and the simulator housing 64a. The master cylinder accommodation chamber 34c and the simulator accommodation chamber 64c are formed in parallel with the axial direction, and the opening portion 34e of the master cylinder accommodation chamber 34c and the opening portion 64e of the simulator accommodation chamber 64c are open toward the same direction in the axial direction. According to this structure, it is possible to form the master cylinder accommodation chamber 34c and the simulator accommodation chamber 64c by a machining in the same direction, thereby making it possible to reduce the machining cost.

Since the components (for example, the components of the pressure sensor mechanism and the valve mechanism) which are attached to the master cylinder 34 and the stroke simulator 64 are accommodated in the sensor valve unit 300 (the components accommodation box) while the sensor valve unit 300 is attached to the housing 14a of the master cylinder 34 and the stroke simulator 64, the input device 14 can be reduced (compact) in size.

The sensor valve unit 300 is attached to the housing 14a. During operation of the vehicle V, the engine room R is heated by the heat generation of the power unit 3 and the like. In contrast, the temperature in the engine room R during no operation drops to an ambient temperature (below zero in winter). When the input device 14 is exposed to such temperature changes, dew condensation may occur in the housing 300a constituting the sensor valve unit 300. If the housing 300a is sealed to prevent the ingress of water, stresses occur repeatedly at the housing 300a by the volume changes of the gas due to the large temperature differences between during operation and during no operation. To prevent the dew condensation and the repeated stress from occurring, it is considered that breathing holes are drilled in the housing 300a. However, when water (for example, water during washing of the vehicle V or during submergence of the vehicle V) enters into the engine room R, there is a possibility that water may enter into the sensor valve unit 300 via the breathing holes, because the breathing holes are in communication with the inside of the engine room R and the inside of the sensor valve unit 300. Although it is possible to make the breathing holes a labyrinth structure so that the water hardly enters into the sensor valve unit 300, there are problems that the manufacturing cost increases while the manufacturing processes are complicated.

In the housing 14a of the input device 14, there is a ventilation hole 307 having one end facing the inside of the sensor valve unit 300 and the other end facing the inside of the mounting surface 304a of the input device 14 on the dashboard 2. Therefore, since the other end of the ventilation hole 307, which is a breathing hole of the sensor valve unit 300, is covered by the dashboard 2, it is possible to prevent foreign substances and water from entering into the sensor valve unit 300 from outside via the ventilation hole 307. As a consequence, the reliability of the operation of the pressure sensor mechanism and the valve mechanism stored in the sensor valve unit 300 is improved. The ventilation between the ventilation hole 307 and the inside of the vehicle compartment C can be performed via the gap 2c between the master cylinder 34 and the dashboard 2.

Since the ventilation hole 307 is not open to the engine room R by the gasket G, but communicates only with the gap 2c between the master cylinder 34 and the dashboard 2, it is possible to prevent more effectively the foreign substances and water from entering into the sensor valve unit 300 from the outside via the ventilation hole 307. In addition, since the waterproof ventilation member 307c is disposed at the opening of the ventilation hole 307, it is possible to prevent more reliably the foreign substances (including minuscule droplets of water) such as dust in the vehicle compartment C from entering into the sensor valve unit 300 via the ventilation hole 307.

Since the other end of the ventilation hole 307 faces the hollow portion 305, the hollow portion 305 not only contributes to the weight reduction of the input device 14, but also functions as a so-called dry area which is formed on the other end of the ventilation hole 307.

Since the housing 14a is formed in the casting and the hollow portion 305 is formed by the casting out, the portion corresponding to the hollow portion 305 during casting is formed in consideration of shrinkage, misrun, and the like, and the machining efficiency is improved, because the machining dedicated to lightening such as cutting is not necessary separately.

The master cylinder 34 has a portion (a rear portion) extending into the vehicle compartment C via the dashboard 2, while the other end of the ventilation hole 307 facing the inside of the mounting surface of the input device 14 on the dashboard 2 is formed near the master cylinder 34. Therefore, as described above, the ventilation for the inside of the sensor valve unit 300 can be performed by the ventilation hole 307 via the gap between the master cylinder 34 and the dashboard 2. In this case, since the inside of the sensor valve unit 300 can be ventilated mainly with the inside of the vehicle compartment C in which temperature change (change ratio) is more gradual than the inside of the engine room R, the water condensation in the sensor valve unit 300 can be prevented more reliably. In addition, during the submergence of the vehicle V, it has the effect to be ventilated with the vehicle compartment C in which the water is less likely to enter than in the engine room R.

Since the ventilation hole 307 is formed in the solid portion of the housing 14a along with the axial direction of the master cylinder 34, the input device 14 can be reduced (compact) in size. When the ventilation hole 307 is formed by drilling into the housing 14a, the forming process can be performed very easy.

The ports 54b, 65a of the master cylinder 34 and the stroke simulator 64 are formed respectively on the upper portions of the master cylinder 34 and the stroke simulator 64. Therefore, according to the input device 14, when filling the brake fluid into the master cylinder 34 and the stroke simulator 64 as well as removing the air in the master cylinder 34 and the stroke simulator 64, it is easy to remove the air from the bleeder 301 (see FIG. 3B).

Since the input device 14 is mounted on the dashboard 2 so that the axial direction of the master cylinder 34 is inclined with a gradient rising toward the front of the vehicle V, the bleeder 301 is disposed on the front end portion of the input device 14 and on the high position of the gradient rising. As a consequence, the removal of the air via the bleeder 301 is more facilitated.

The input device 14 has the third shutoff valve 62 built-in which is disposed in the middle of the second hydraulic path 58b which connects the ports 54b, 65a of the master cylinder 34 and the stroke simulator 64 with each other. Therefore, according to this input device 14, it is possible to construct the vehicle brake system 10 which is simplified more than, for example, a vehicle brake system 10 which has the third shutoff valve 62 outside the input device 14.

As shown in FIG. 3A, according to the input device 14, since the connector 36a, the first connection port 20a, and the second connection port 20b are formed toward the front of the input device 14, the processes to attach the piping tube 86 (see FIG. 2), the first piping tube 22a (see FIG. 2), and the fourth piping tube 22d (see FIG. 2) respectively to the connector 36a, the first connection port 20a, and the second connection port 20b of the input device 14 secured to the dashboard 2 (see FIG. 1) are facilitated.

Although the embodiments according to the present invention are described above, the present invention is not limited to the above embodiments, and is performed in various embodiments. Although the master cylinder 34 and the stroke simulator 64 are arranged side by side as described in the above embodiments, they can be arranged in tandem. A common reservoir may be provided separately from the first and second reservoirs 36, 84, and the brake fluid stored in the common reservoir may be supplied to the respective reservoirs 36, 84 via the piping tubes. The vehicle brake system 10 may be also applied to a left-hand drive vehicle.

REFERENCE SIGNS LIST

2: dashboard
10: vehicle brake system
12: brake pedal (brake operation element)
14: input device
16: motor cylinder device (electric brake actuator)
34: master cylinder
58*b*: second hydraulic path
58*c*: branch hydraulic path
64: stroke simulator
64*c*: simulator accommodation chamber
64*e*: opening portion
66*a*, 66*b*: simulator spring (urging member)
67: plug (receiving member)
68: simulator piston
69: holding ring (holding unit)

The invention claimed is:

1. A vehicle brake system comprising:
   an input device for detecting an amount of operation by an operator; and
   an electric brake actuator for generating a first brake hydraulic pressure at least on the basis of an electric signal according to the amount of operation,
   wherein the input device is integrally formed to include a master cylinder and a stroke simulator, the master cylinder generating a second brake hydraulic pressure in response to an input by a piston connected to a brake operation element, and the stroke simulator being integrally provided with the master cylinder as well as communicating with the master cylinder via a hydraulic communication path,
   wherein the stroke simulator includes a simulator piston and a simulator housing having a simulator accommodation chamber formed therein which accommodates the simulator piston, the simulator piston having a hollow cylindrical piston body with a plurality of openings formed through a side wall thereof,
   the simulator piston being movable against an urging force of an urging member by being driven by the second brake hydraulic pressure in the simulator accommodation chamber, and
   the simulator accommodation chamber including an opening portion which allows the simulator piston to be inserted into the simulator accommodation chamber from a side on which the brake operation element is disposed,
   wherein a receiving member for receiving an input load to the simulator piston is disposed on the opening portion, and
   the receiving member is held in the simulator housing by a holding ring which is detachable with the simulator housing in a state that the urging member and the simulator piston are accommodated in the simulator accommodation chamber.

2. The vehicle brake system as set forth in claim 1, wherein the opening portion is covered with a dashboard in a mounted state of the input device.

3. The vehicle brake system as set forth in claim 2, wherein the receiving member is disposed to be prevented from coming off by the dashboard.

4. The vehicle brake system as set forth in claim 2, wherein the input device is mounted on the dashboard, and the master cylinder and the stroke simulator are arranged side by side.

5. The vehicle brake system as set forth in claim 4, wherein the input device is attached with a valve unit and the hydraulic communication path is formed inside the input device via the valve unit.

6. The vehicle brake system as set forth in claim 1, wherein the urging member is arranged between the simulator piston and the receiving member, and urges the simulator piston.

7. The vehicle brake system of claim 1, wherein the urging member comprises first and second simulator springs arranged in series, wherein the stroke simulator of the input device further comprises a first spring seat abuttingly contacting the receiving member and having a protrusion thereon which fits inside of a rear end of the first simulator spring, and a second spring seat having a protrusion thereon which fits inside of a front end of the first simulator spring and which receives the second simulator spring therein,
   and wherein the first and second spring seats are operatively connected by a linking member extending between the respective protrusions thereof.

8. The vehicle brake system of claim 7, wherein the receiving member has an alignment boss formed thereon which fits inside of the protrusion of the first spring seat.

9. A vehicle brake system comprising:
   an input device for detecting an amount of operation by an operator; and
   an electric brake actuator for generating a first brake hydraulic pressure at least on the basis of an electric signal according to the amount of operation,
   wherein the input device is integrally formed to include a master cylinder and a stroke simulator, the master cylinder generating a second brake hydraulic pressure in response to an input by a piston connected to a brake operation element, and the stroke simulator being integrally provided with the master cylinder as well as communicating with the master cylinder via a hydraulic communication path,
   wherein the stroke simulator includes a simulator piston and a simulator housing having a simulator accommodation chamber formed therein which accommodates the simulator piston,
   the simulator piston being movable against an urging force of an urging member by being driven by the second brake hydraulic pressure in the simulator accommodation chamber, the urging member comprising first and second simulator springs arranged in series, and
   the simulator accommodation chamber including an opening portion which allows the simulator piston to be inserted into the simulator accommodation chamber from a side on which the brake operation element is disposed,
   wherein a receiving member for receiving an input load to the simulator piston is disposed on the opening portion,
   the receiving member is held in the simulator housing by a holding ring which is detachable with the simulator housing in a state that the urging member and the simulator piston are accommodated in the simulator accommodation chamber,
   wherein the stroke simulator of the input device further comprises:
   a first spring seat abuttingly contacting the receiving member and having a protrusion thereon which fits inside of a first end of the first simulator spring, and
   a second spring seat having a protrusion thereon which fits inside of a second end of the first simulator spring and which receives the second simulator spring therein, and wherein the first and second spring seats are operatively connected by a linking member extending between and through holes in the respective protrusions thereof.

* * * * *